G. MATRICARDI.
GASEOUS POWER GENERATOR.
APPLICATION FILED MAR. 6, 1911.

1,036,288.

Patented Aug. 20, 1912.

Witnesses

Inventor:
Giuseppe Matricardi,
Per
Attorney

UNITED STATES PATENT OFFICE.

GIUSEPPE MATRICARDI, OF PALLANZA, ITALY.

GASEOUS-POWER GENERATOR.

1,036,288.  Specification of Letters Patent. Patented Aug. 20, 1912.

Application filed March 6, 1911. Serial No. 612,720.

*To all whom it may concern:*

Be it known that I, GIUSEPPE MATRICARDI, a subject of the Italian King, and resident at Pallanza, Lago Maggiore, Italy, have invented certain new and useful Improvements in Gaseous-Power Generators.

This invention relates to improvements in gaseous power generators.

The present invention has for its object to provide an explosion compressor, into which the air and the combustible are drawn and compressed, then burned under high pressure, and finally mixed with fresh air, so that the total mixture arrives in the reservoir at a temperature of 100° Cels. and under a pressure which may vary within certain limits. The result is that nearly the total caloric energy of the burned combustible is retained in the gases of the reservoir, in the form of pressure or heat, and that the total efficiency of a motor operated by an explosion compressor, of the type of the present invention, or by a turbine, depends only on the efficiency of the turbine.

In the annexed drawing, given by way of example, two forms of the invention have been shown.

Figure 1:
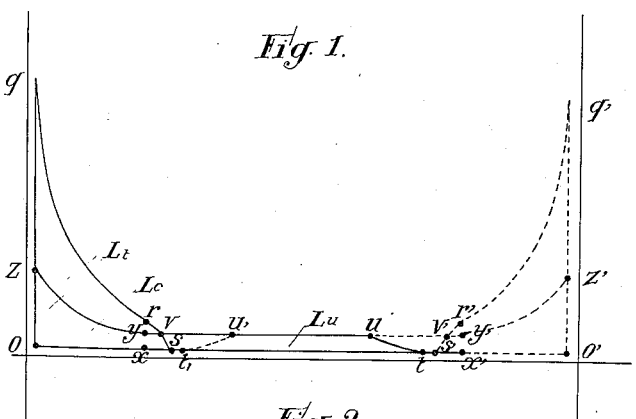
Figure 2:
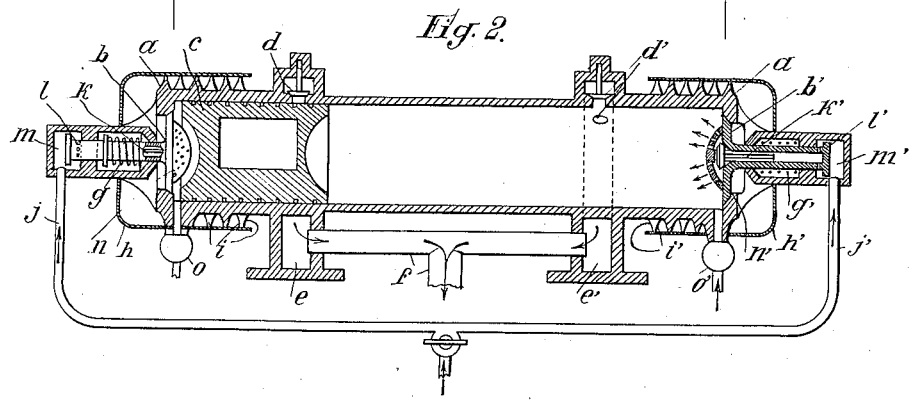
Figure 3:
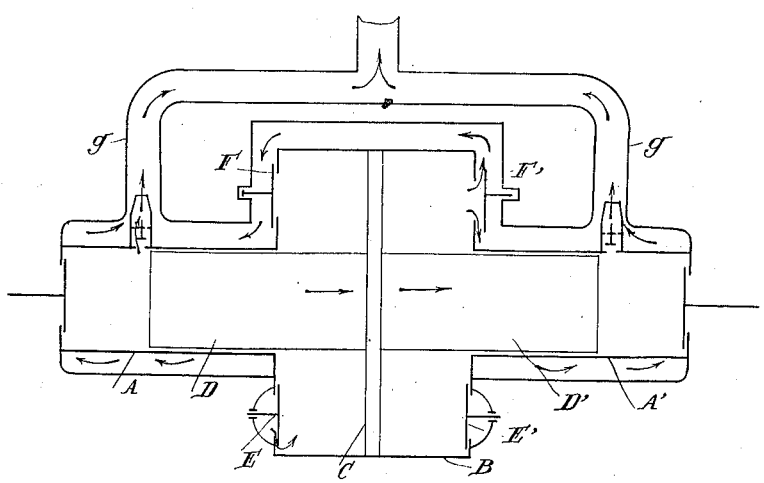

Figure 1 is a diagram of the expansion and compression. Fig. 2 is a longitudinal section of the compressor constructed according to this invention. Fig. 3 is a diagrammatic view of a second form.

With reference to Fig. 2, $a$ represents a cylinder closed at both ends by automatic inlet valves $b$, $b'$ and wherein a piston $c$ moves, the mass thereof being calculated, in accordance with conditions. At a certain distance from the ends of the cylinder $a$ are disposed automatic outlet valves $d$, $d'$. The latter permit the escape of the gases from the cylinder into the chambers $e$, $e'$ communicating with a reservoir under pressure, not shown, by means of the pipe $f$. The valves $b$, $b'$ are held on their seats by means of springs $g$, $g'$, respectively, and said valves open when a slight reduction of pressure is produced within the cylinder. The air is guided by the envelops $h$, $h'$ covering heat radiating ribs $i$, $i'$, which are serrated to permit the passage of air. The stems of the valves $b$, $b'$ fit closely in their guides and extend into chambers $m$, $m'$, wherein discharge pipes $j$, $j'$ open and supply the gases, the combustible vapor or the pulverized combustible under a pressure, which may be slightly greater than that of the reservoir or the pipe $f$. The said gases or combustible vapors may be controlled by means of a cock $p$. The stems of the valves $b$, $b'$ are hollow and the passages thus formed are closed at one end by small free valves $k$, $k'$. Said passages communicate on their other ends with the chambers $m$, $m'$, by means of small orifices $l$, $l'$. Communication is established during closure of the inlet valves $b$, $b'$, when the apertures $l$, $l'$ are opened, in order to permit the gases or combustible vapors to enter the cylinder through the passages if the pressure is sufficient. The caps $n$, $n'$ which are perforated and fixed to the valves $b$, $b'$, serve to divide the gases or vapors into very fine jets so as to assure a more homogeneous carburation of a part of the air of the cylinder. As soon as the valves $b$, $b'$ are opened, the apertures $l$, $l'$ are closed, and entrance of the gases or combustible vapors into the cylinder is thus interrupted. This arrangement may otherwise be applied to the distributing valve motion of all internal combustion engines. The cocks $o$, $o'$ control air under high pressure to start the piston. It is possible to substitute for this starting method, an explosive charge which may take the place of one of the cocks $o$, $o'$.

The operation is the following: The piston is assumed to be in the position shown in Fig. 2, and a pressure, represented by the ordinate $x$—$y$ of the diagram of the Fig. 1, existing within the reservoir, the pipe $f$ and the chambers $e$, $e'$. If there is introduced a high pressure through the cock $o$, the piston is immediately moved to the right hand end and the gases admitted by the cock $o$ expand according to the adiabatic curve $q$—$r$. At the point $r$ of the diagram, the piston $c$ uncovers the aperture to the valve $d$, and the latter opens and permits the free escape of the excess of pressure into the chambers $e$ and into the reservoir. When the left hand side of the piston corresponds to the point $o$, of the diagram, the excess of pressure has also been discharged and the valve $d$ closes automatically. At this moment the gases on the left hand end of the piston expand according to the adiabatic curve $v$—$s$. When the left hand end of the piston corresponds to the point $s$, the pressure is slightly less than atmospheric, which results in opening of the valve $b$; air being admitted into the cylinder wherein the pressure remains constant, as indicated by the line $s$—$t$ of the diagram. When the position of the left hand side of the piston corresponds to the point $s$, the compressed gas admitted into the cylinder through the cock $o$, has performed a certain work measured by the area $$Lt = (g, r, v, s, o).$$

This work reduced, by the losses and the compression work produced at the same time by the right hand end of the piston, is accumulated in the latter in the form of kinetic energy; the piston having then acquired a certain velocity. Owing to this kinetic energy the piston continues to advance to the right and only stops after the said kinetic energy has been utilized. The piston when advanced to the right, compresses this air according to the adiabatic curve $t^1$—$u^1$. The pressure existing with the cylinder at the point $u^1$ is slightly greater than that in the reservoir, which automatically controls unseating of the valve $d'$, the pressure being thus maintained constant from $u^1$—$y^1$. The compression work effected by the piston during the stroke $t^1$—$x^1$ is measured by the area, $t^1$, $u^1$, $y^1$, $x^1$, $i. e.$ L U (useful work). The aperture of the valve $d'$ is entirely closed when the right hand face of the piston arrives opposite to the points $y^1$—$x^1$ of the diagram. At this moment, the escape of air is interrupted, and the compression work commences according to the adiabatic curve $y^1$—$z^1$, this compression work being done by the piston, is given by the area $$x^1, y^1, z^1, o^1 = Lc.$$

During the stroke of the piston, friction, etc., is produced, these losses being compensated for by a part of the kinetic energy of the piston, their sum being indicated by $Lr$. As soon as the piston stops it has utilized its entire kinetic energy and the result is $$Lt = Lu = Lc = Lr.$$

If just at the moment of starting of the piston, one opens the cock $p$, for the arrival of the combustible under pressure, a certain quantity of combustible gas enters into the cylinder during the stroke of the piston from $t^1$ to $x^1$, and the air in the cylinder, near the valve $b'$, is carbureted. During the compression period $y^1$—$z^1$, the air is highly heated, and, supposing that the instantaneous explosion of the gaseous mixture happens at the moment when the right hand of the piston coincides with the line $z^1$, $o^1$, of the diagram, one obtains an instantaneous increase of the pressure which rises from $z^1$ to $q^1$.

Spontaneous explosion is preferable, but one could produce the explosion by a priming apparatus as used for ordinary internal combustion engines. Therefore, the piston is immediately moved in the left hand direction and the same phenomena are produced as during the first stroke from the left to the right, and so on.

Each stroke must have for result the equation:

$$Lt = Lu + Lc + Lr,$$

but if the first stroke is superior to the second, one obtains an increase of the velocity of the piston while on the contrary, if the second is greater than the first, one obtains a retardation and even stopping of the piston. The governing of the velocity of the said piston may thus be effected within certain limits by opening the valve $p$ of the combustible, more or less.

It will be understood from the foregoing, that all the caloric energy of the combustible burned with the present explosion compressor, comprises the energy wasted by friction, except that the irradiated heat, is again integrally found within the reservoir in the form of pressure and heat, the efficiency of the apparatus being, so to speak, nearly equal to the unity.

For large engines, the cylinder of the compressor could be too long and in such a case the compressor may have the form shown in Fig. 3, wherein the cylinder is divided into the halves A—A', concentrically connected to a cylinder B having a greater diameter, within which moves a piston C, made in one piece with the two pistons D, D'. The cylinder B works like a double acting air pump and is provided with inlet and outlet valves E, E', and F, F', while the two cylinders A, A' and their pistons D, D' work in the same manner as in the form described with reference to the Fig. 2. In this, and also in the foregoing case, the cooling may be effected by ribs or by water, in the meantime the cooling is not obtained in Fig. 3 by aspiration, but by the air driven out by the great cylinder, this air being thus obliged to follow the path indicated by the arrows, with the assistance of conduits and diaphragms.

The invention is not limited to the form of embodiment set forth but different modifications may be made within the scope of the claims, and notably, with reference to the distribution of the combustible, without departing from the principle of the invention.

I claim:

1. A gaseous power generator comprising in combination, a cylinder, a projectile like piston in said cylinder, a valve pressure fluid outlets between the ends of the cylinder arranged to communicate with the device to be supplied with pressure fluid, air inlet valves opening to the ends of the cylinder, each air valve having a hollow stem and inlet openings therefor, a freely acting valve closure within each stem, and bearing chambers for said stems acting as closures for the inlets of said stems and having pressure connections opening to said chambers, substantially as described.

2. A power generator comprising in combination, a cylinder, a projectile like piston in said cylinder, valve pressure fluid outlets between the ends of the cylinder arranged to communicate with the device to be supplied with fluid pressure, valve control fluid pressure starting means communicating with the ends of said cylinder, air inlet valves opening to the ends of the cylinder, each air inlet valve having a hollow stem provided with inlet perforations, a freely movable valve closure in each stem, and bearing members acting to close said openings in said stems upon movement of the latter and having pressure connections opening to said chambers, substantially as described.

In testimony whereof I have hereunto set my hand in presence of two witnesses.

GIUSEPPE MATRICARDI.

Witnesses:
OTTO VON LASSARA,
LYLE ROBB.